US012725944B2

(12) United States Patent
Dyck et al.

(10) Patent No.: US 12,725,944 B2
(45) Date of Patent: Sep. 1, 2026

(54) CONNECTING TERMINAL FOR CONNECTING AT LEAST TWO ELECTRIC CONDUCTORS

(71) Applicant: WAGO Verwaltungsgesellschaft mbH, Minden (DE)

(72) Inventors: Tobias Dyck, Rahden (DE); Hans-Josef Koellmann, Minden (DE); Henning Meier, Bueckeburg (DE); Stefan Graefen, Minden (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 419 days.

(21) Appl. No.: 18/377,092

(22) Filed: Oct. 5, 2023

(65) Prior Publication Data

US 2024/0030625 A1 Jan. 25, 2024

Related U.S. Application Data

(63) Continuation of application No. PCT/EP2022/059123, filed on Apr. 6, 2022.

(30) Foreign Application Priority Data

Apr. 7, 2021 (DE) ..................... 10 2021 108 627.2

(51) Int. Cl.
*H01R 4/48* (2006.01)

(52) U.S. Cl.
CPC ........... *H01R 4/484* (2023.08); *H01R 4/4811* (2023.08); *H01R 4/4816* (2023.08); *H01R 4/4833* (2023.08)

(58) Field of Classification Search
CPC .. H01R 4/4811; H01R 4/4816; H01R 4/4833; H01R 4/484
See application file for complete search history.

(56) References Cited

U.S. PATENT DOCUMENTS

| | | | | |
|---|---|---|---|---|
| 3,345,606 A | 10/1967 | Scoville | | |
| 4,767,340 A * | 8/1988 | Hohorst | H01R 13/501 439/828 | |
| 4,768,981 A * | 9/1988 | Hohorst | H01R 4/4846 439/828 | |
| 12,119,604 B2 * | 10/2024 | Schmidt | B23K 20/10 | |

(Continued)

FOREIGN PATENT DOCUMENTS

| | | |
|---|---|---|
| DE | 3420941 A1 | 12/1984 |
| DE | 3514097 A1 | 10/1986 |

(Continued)

OTHER PUBLICATIONS

International Search Report dated Aug. 3, 2022 in corresponding application PCT/EP2022/059123.

(Continued)

*Primary Examiner* — Abdullah A Riyami
*Assistant Examiner* — Thang H Nguyen
(74) *Attorney, Agent, or Firm* — Muncy, Geissler, Olds & Lowe, P.C.

(57) ABSTRACT

A connecting terminal for connecting at least two electric conductors to one another, wherein the connecting terminal has a housing in which at least a first conductor guide passage for guiding a first electric conductor and at least a second conductor guide passage for guiding a second electric conductor are formed.

16 Claims, 4 Drawing Sheets

(56) References Cited

U.S. PATENT DOCUMENTS

| | | | | |
|---|---|---|---|---|
| 2007/0178747 | A1* | 8/2007 | Schrader ................ | H01R 4/485 439/441 |
| 2011/0212653 | A1* | 9/2011 | Koellmann .......... | H01R 4/4821 439/700 |
| 2016/0276758 | A1* | 9/2016 | Warashina ............. | A47B 39/00 |
| 2018/0316101 | A1* | 11/2018 | Chaillet ............... | H01R 9/2616 |

FOREIGN PATENT DOCUMENTS

| | | | | | |
|---|---|---|---|---|---|
| DE | 202016101269 | U1 | | 6/2017 | |
| WO | WO-2007137777 | A1 | * | 12/2007 | ............. H01R 4/485 |
| WO | WO-2017102829 | A1 | * | 6/2017 | ........... H01R 4/4828 |

OTHER PUBLICATIONS

International Preliminary Report on Patentability dated Oct. 10, 2023 in corresponding application PCT/EP2022/059123.

* cited by examiner

CONNECTING TERMINAL FOR CONNECTING AT LEAST TWO ELECTRIC CONDUCTORS

This nonprovisional application is a continuation of International Application No. PCT/EP2022/059123, which was filed on Apr. 6, 2022, and which claims priority to German Patent Application No. 10 2021 108 627.2, which was filed in Germany on Apr. 7, 2021, and which are both herein incorporated by reference.

BACKGROUND OF THE INVENTION

Field of the Invention

The invention relates to a connecting terminal for connecting at least two electric conductors to one another, wherein the connecting terminal has a housing, in which at least a first conductor guide passage for guiding a first electric conductor and at least a second conductor guide passage for guiding a second electric conductor are formed.

Description of the Background Art

Connecting terminals are known in a variety of different designs, for instance as a screw type terminal block. An improved connecting terminal with a clamping spring for clamping the electric conductors together is known from DE 35 14 097 C2, which corresponds to U.S. Pat. No. 4,767,340, which is incorporated herein by reference.

SUMMARY OF THE INVENTION

It is therefore an object of the invention to provide a further improved connecting terminal.

This object is attained in an example with a connecting terminal in that a first and second conductor guide passages cross one another obliquely at an angle at a conductor clamping point where the first electric conductor can be clamped together with the second electric conductor. Such a conductor connection terminal can be provided with extremely little effort, since it can be implemented with very few components. In particular, such a connecting terminal can be implemented without the bus bar known from other conductor connection terminals. This becomes possible because the first and second electric conductors are not each connected to a bus bar section as in the prior art, but instead can be clamped directly to one another at the conductor clamping point in the connecting terminal according to the invention, which is to say brought into immediate mechanical and electrical contact. The first and second conductor guide passages are therefore designed to be open to the extent that the electric conductors can be brought into direct contact with one another, at least in the region of the conductor clamping point.

The first conductor guide passage and/or the second conductor guide passage in this case can advantageously be made of the housing material, for example be formed in one piece with one or more housing parts of the housing. The housing advantageously can be designed as an insulating housing, which is to say made of an insulating material such as a plastic.

The first conductor guide passage and/or the second conductor guide passage can be designed as a continuous passage or as a passage with one or more interruptions. The connecting terminal can also be designed to connect more than two electric conductors to one another. In this case, the connecting terminal has one or more additional conductor guide passages in an advantageous embodiment. In an advantageous embodiment, the conductor clamping points can then be designed such that two electric conductors inserted into the conductor guide passages cross at each conductor clamping point and can be clamped directly together there. If, for example, a third electric conductor is present, it can cross the second electric conductor obliquely at an angle at a conductor clamping point where the third electric conductor can be clamped together with the second electric conductor.

According to an advantageous embodiment of the invention, provision is made that the connecting terminal has at least one clamping spring made of metal, through which the first electric conductor and the second electric conductor can be clamped together at the conductor clamping point. This permits a reliable, long-lasting, and quick-to-produce electrical connection between the first and second electric conductors. The conductor clamping point is automatically closed by spring force owing to the clamping spring. The first and second electric conductors are then pressed against one another via the clamping spring. The clamping spring can be made of a suitable spring steel, for example of chromium nickel steel. To increase the electrical conductivity, the clamping spring can additionally be coated with a high-conductivity material, for example with copper.

The connecting terminal can have an actuating element, e.g., an actuating pusher or an actuating lever, for manually opening the conductor clamping point, which is to say for deflecting the clamping spring. The connecting terminal can also be designed without its own actuating element. In this case, the conductor clamping point can be opened by, e.g., a suitable tool, such as a screwdriver.

The clamping spring can have a first and a second spring leg, which are bent toward one another. The conductor clamping point can then be arranged between the first and second spring legs, for example. For instance, the clamping spring can be formed in the manner of a clip or clamp. To increase the clamping force of the clamping spring, a reinforcing spring can additionally be mounted thereon.

The second leg end can extend through a cutout in the first leg end. In this way, the clamping spring can be designed very compactly and exert a high clamping force at the same time. The cutout can be designed as a window-like cutout, for example. The clamping spring can be designed as a cage clamp, for example.

The conductor clamping point can be arranged in the region of the cutout in the first leg end. Consequently, the electric conductors advantageously cross in the region of the cutout. A high clamping force can be exerted on the electric conductors at this point by the clamping spring without the spring being excessively deformed.

The clamping spring can be arranged completely or at least largely inside the housing. In this way, the electrically conductive elements of the connecting terminal can be insulated well and protected from accidental contact. Advantageously, the housing can thus form a protective cover with clearances and creepage distances around the conductor clamping point.

The angle between the first wire guide passage/conductor guide passage and the second wire guide passage/conductor guide passage at the conductor clamping point can be between 3° and 90°, in particular between 3° and 80°. This permits especially reliable clamping of the electric conductors to one another, in particular without the risk of a conductor slipping to the side.

The first conductor guide passage may terminate at a first conductor insertion opening in a housing wall of the housing, and the second conductor guide passage terminates at a second conductor insertion opening in a housing wall of the housing. The conductor insertion openings can thus be formed at such housing walls. The housing wall can be, in particular, an exterior wall of the housing.

The first and the second conductor insertion openings can be arranged in the same housing wall or in different housing walls that are arranged at an angle to one another. This permits a variety of design possibilities for the connecting terminal for extremely diverse application cases.

The longitudinal axis of the first conductor guide passage can run obliquely with respect to the housing wall, at least in the region of the first conductor insertion opening, and/or the longitudinal axis of the second conductor guide passage can run obliquely with respect to the housing wall, at least in the region of the second conductor insertion opening. The longitudinal axis in this case can run, in particular, obliquely with respect to regions of the housing wall immediately adjacent to the respective conductor insertion opening, in which wall the conductor insertion opening is located. The longitudinal axis of the respective conductor guide passage in this case is the center axis, which is to say an imaginary line running in the center in each conductor guide passage.

The longitudinal axis of the first conductor guide passage can be curved, at least in sections and/or the longitudinal axis of the second conductor guide passage is curved, at least in sections. In this way, the desired intersection of the conductor guide passages can be achieved with little effort even in the case of first and second conductor insertion openings arranged in the same housing wall. Moreover, it is possible that the longitudinal axes of the conductor guide passages run at right angles with respect to the housing wall, at least in the region of the associated conductor insertion openings. As a result, an intuitively convenient perpendicular insertion of the electric conductors in the connecting terminal becomes possible.

The connecting terminal can be designed with no bus bar. In this way, the connecting terminal can be provided with a minimum of component parts. As a result, a relatively low weight of the connecting terminal is also made possible.

The connecting terminal can be designed for direct connection between the first and second electric conductors. The first electric conductor therefore rests directly on the second electric conductor in the clamped-together state. The first and second electric conductors are, of course, to be positioned in the stripped state, at least in the region of the conductor clamping point.

A first conductor stop for limiting the insertion depth of the first electric conductor and/or a second conductor stop for limiting the insertion depth of the second electric conductor may be present in the housing. As a result, a simple haptic check is possible as to whether the respective electric conductor is inserted correctly. Moreover, the desired clearances and creepage distances can be ensured.

The clamping spring can be mounted in the housing in a fixed or floating manner, which is to say that in the case of a floating mounting, it can be freely movable in a certain region.

The connecting terminal according to the invention has the advantage that electric conductors of any type can be connected thereto, both solid conductors and multi-stranded or fine-stranded conductors, which is to say litz wires. Electric conductors made of fundamentally any material, for example copper or aluminum, can be connected. It is also possible to connect electric conductors having a wire ferrule attached thereto to the connecting terminal. The conductor connection can be designed as a self-supporting system in this case. The connecting terminal can be designed for different conductor cross-sections.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
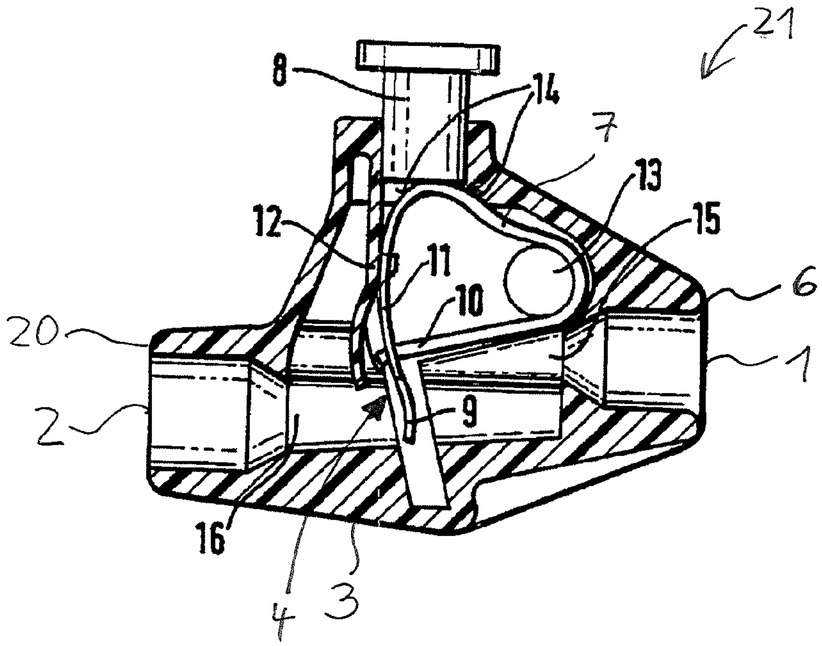
FIG. 1 shows a connecting terminal in a sectional side view.
Figure 2:
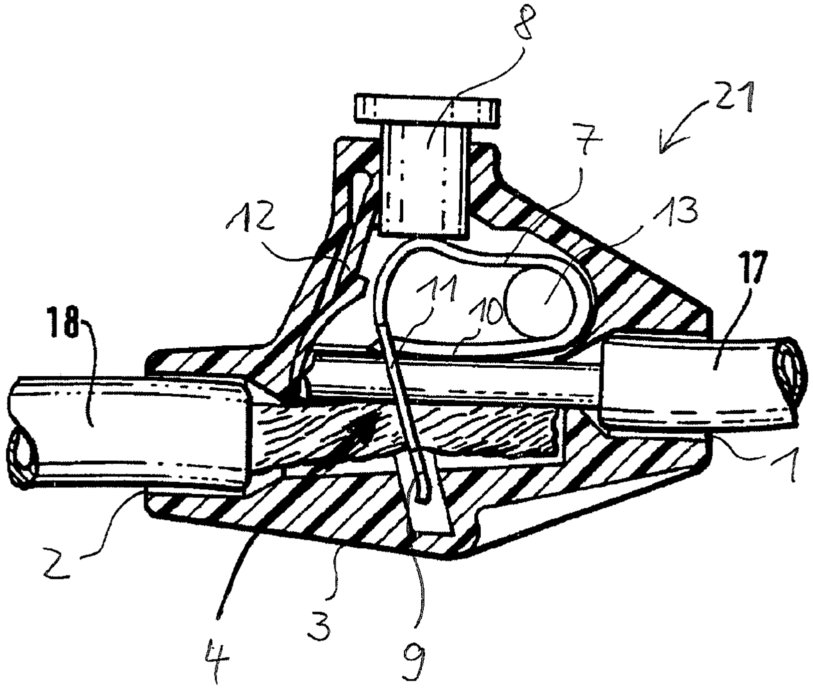
FIG. 2 shows the connecting terminal from FIG. 1 with electric conductors connected.

The connecting terminal 21 shown in FIGS. 1 and 2 has a housing 3, for example an insulating housing, which can be constructed of two housing parts, for example. Located in the housing 3 is a clamping spring 7. A first conductor guide passage 15 and a second conductor guide passage 16 are formed in the housing material of the housing 3. The first conductor guide passage 15 terminates in a housing wall 6 of the housing 3, where a first conductor insertion opening 1 is located. The second conductor guide passage 16 terminates in another housing wall 20 of the housing 3, where a second conductor insertion opening 2 is located. The conductor guide passages 15, 16 cross one another obliquely at an angle at a conductor clamping point 4. On account of the section plane shown, the crossing angle is not visible in FIGS. 1 and 2, but is explained below on the basis of other figures.

The clamping spring 7 is formed from a resilient flat material and has two leg ends 9, 10, which are bent toward one another in such a manner that one leg end 10 extends through a cutout 11 in the other leg end 9. As a result, this clamping spring 7 is inherently self-supporting. The clamping spring 7 can be arranged to float in the housing or, as shown, can be fixed in position by a retaining pin 13, an end stop 14, and/or a locking lever 12 that engages in the cutout 11.

The connecting terminal 21 additionally has a manual actuating element 8, with which the clamping spring 7 can be mechanically acted upon and thereby deflected in order to manually open the conductor clamping point 4.

FIG. 1 shows the connecting terminal 21 with no electric conductors connected and with the actuating element 8 not actuated. FIG. 2 shows the connecting terminal 21 with a first electric conductor 17, which is arranged in the first conductor guide passage 15, and a second electric conductor 18, which is arranged in the second conductor guide passage 16. The first and second electric conductors 17, 18 cross in the region of the conductor clamping point 4, at least with their stripped regions. The angle at which the electric conductors cross at the conductor clamping point 4 corresponds at least approximately to the angle between the first and second conductor guide passages 15, 16 in the region of the conductor clamping point 4. Consequently, the intersection angle of the electric conductors can be defined, at least approximately, by the design of the conductor guide passages 15, 16.

Figure 3:
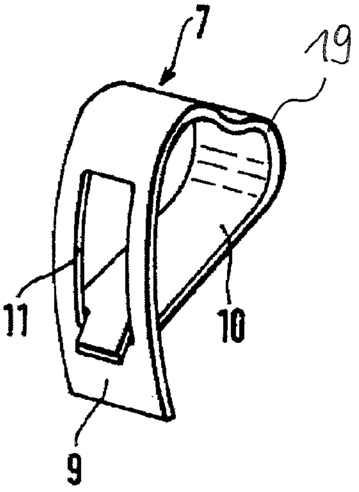
FIG. 3 shows a clamping spring in a perspective view.

FIG. 3 shows the clamping spring 7 as an isolated component. For example, the clamping spring 7 can be designed as a cage clamp. The second leg end which can have the function of a contact leg for holding the clamping spring in the housing 3, can extend over one or more curved regions 19 all the way to the first leg end 9. The first leg end 9 forms a clamping leg. The electric conductors are then clamped in place between the bottom edge of the cutout 11 and the underside of the second leg end 10 facing this bottom edge.

Figure 4:
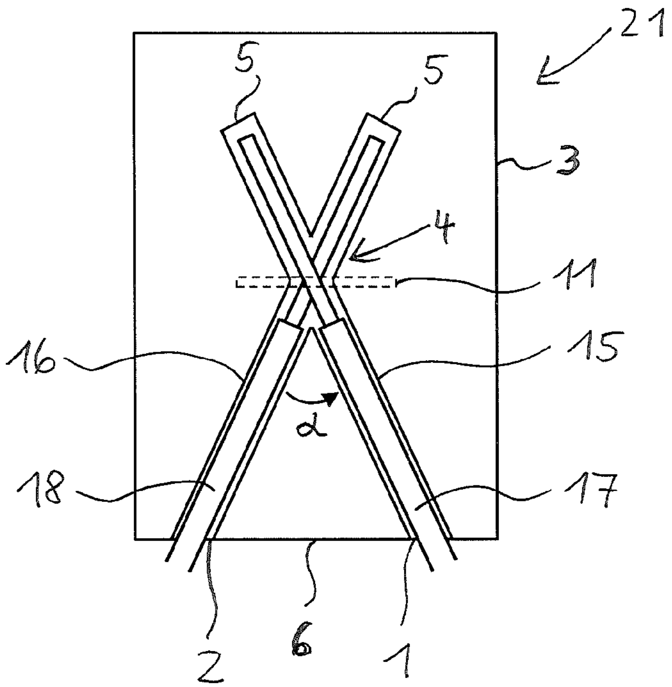
FIG. 4 shows a first variant of crossing conductor guide passages.

A first possible embodiment of the connecting terminal with regard to the crossing conductor guide passages 15, 16 is schematically illustrated by means of FIG. 4. In this exemplary embodiment, both conductor insertion openings 1, 2 are arranged on the same housing wall 6 of the housing 3. The conductor guide passages 16 in this case extend in a straight line (linearly) through the housing 3 and cross one another in the region of the conductor clamping point 4 at an angle α. In the region of the conductor clamping point 4, the conductor guide passages 15, 16 are arranged at height planes that differ at least somewhat from one another so that the inserted electric conductors do not directly collide at the conductor clamping point 4, which is to say at the crossing, but instead are guided past one another. A conductor stop 5 can be present for each of the inserted electric conductors 17, 18, by which means the insertion depth of the respective electric conductor 17, 18 is limited. The conductor stop 5 can be designed as an end wall of the respective conductor guide passage 17, 18, for example.

Figure 5:
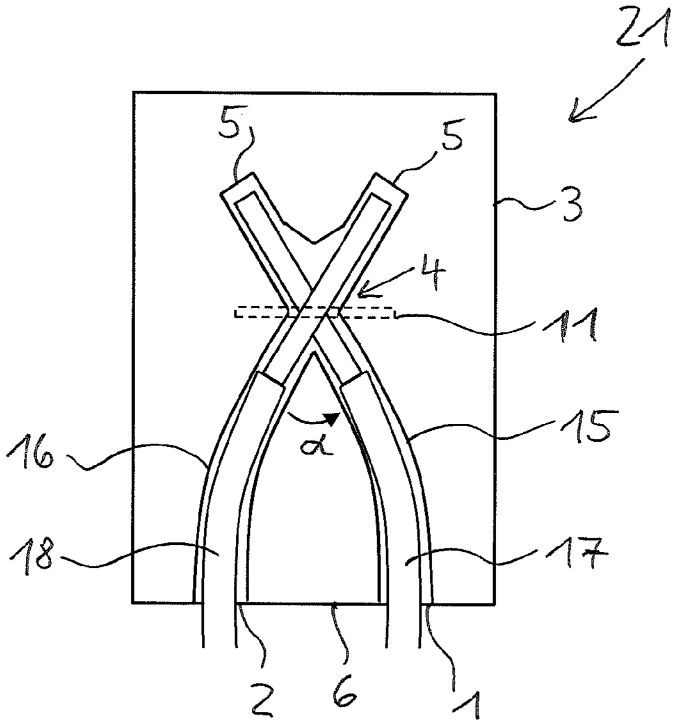
FIG. 5 shows a second variant of crossing conductor guide passages.

FIG. 5 shows another embodiment of the connecting terminal, in which the conductor insertion openings 1, 2 are arranged on the same housing wall 6 in the same way as in the embodiment from FIG. 4. In contrast to the embodiment from FIG. 4, in which the electric conductors 17, 18 must be inserted into the respective conductor guide passage 15, 16 obliquely with respect to the housing wall 6, the embodiment from FIG. 5 allows perpendicular insertion of the electric conductors 17, 18 into the respective conductor guide passage 15, 16. The desired crossing of the conductor guide passages 15, 16 at the conductor clamping point 4 at the angle α is created by the means that the conductor guide passages 15, 16 are designed to be curved, at least in sections. The electric conductors 17, 18 inserted into the conductor guide passages 15, 16 are correspondingly deformed by these curved regions, and are likewise curved accordingly. By this means, the desired crossing of the electric conductors 17, 18 at the conductor clamping point 4 can again be achieved.

Figure 6:
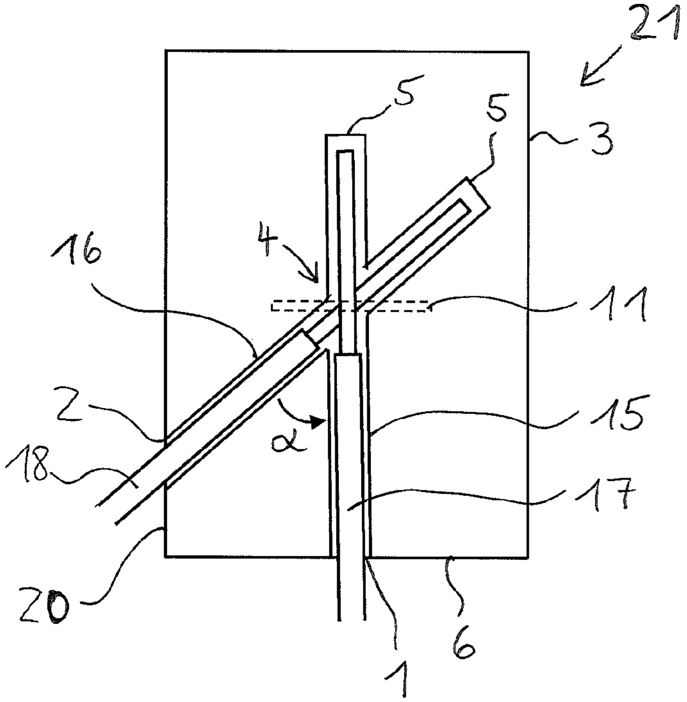
FIG. 6 shows a third variant of crossing conductor guide passages.

FIG. 6 shows an embodiment of the connecting terminal 1 in which the conductor guide passages 15, 16 again run in a straight line, as in FIG. 4, wherein the conductor insertion openings 1, 2 are arranged on different housing walls 6, 20.

As is evident to the person skilled in the art, any combinations of the embodiments shown by means of FIGS. 4 to 6 can also be achieved, for instance variants with one straight conductor guide passage and one that is curved at least in sections.

Figure 7:
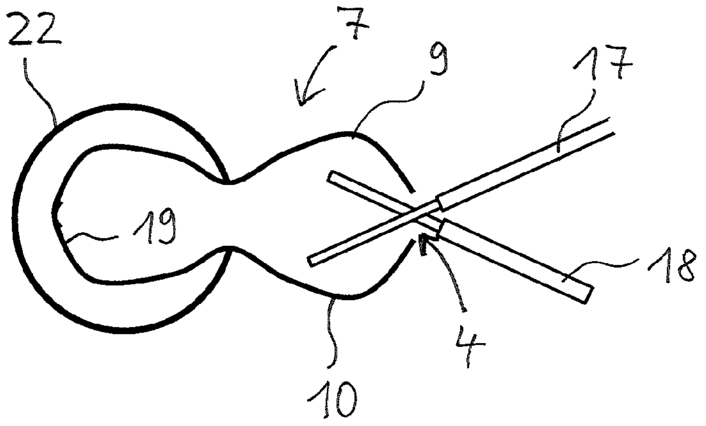
FIG. 7 shows a second variant of a clamping spring.

The connecting terminal 21 can fundamentally be realized with different types of clamping springs. In the examples above, the embodiment of a cage clamp was used as the starting point. FIG. 7 shows an alternative design of a clamping spring 7 in the form of a clamping spring with a curved region 19, from which two leg ends project, namely a first leg end 9 and a second leg end 10, that are, for example, symmetrically designed. The conductor clamping point 4 is located between the free ends of the leg ends 9, 10. In this case, the clamping spring 7 is designed without a cutout 11. To increase the clamping force, a reinforcing spring 22 can optionally also be mounted on the clamping spring 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A connecting terminal to connect at least two electric conductors to one another, the connecting terminal comprising:

a housing in which at least a first conductor guide passage to guide a first electric conductor and at least a second conductor guide passage to guide a second electric conductor are formed, the first and second conductor guide passages cross one another obliquely at an angle at a conductor clamping point where the first electric conductor is adapted to be clamped together with the second electric conductor.

2. The connecting terminal according to claim 1, wherein the connecting terminal has at least one clamping spring made of metal, through which the first electric conductor and the second electric conductor are adapted to be clamped together at the conductor clamping point.

3. The connecting terminal according to claim 2, wherein the at least one clamping spring has a first leg end and a second leg end, which are bent toward one another.

4. The connecting terminal according to claim 3, wherein the second leg end extends through a cutout in the first leg end.

5. The connecting terminal according to claim 4, wherein the conductor clamping point is arranged in a region of the cutout in the first leg end.

6. The connecting terminal according to claim 2, wherein the at least one clamping spring is arranged completely or at least largely inside the housing.

7. The connecting terminal according to claim 1, wherein the housing forms a protective cover with clearances and/or creepage distances around the conductor clamping point.

8. The connecting terminal according to claim 1, wherein the angle between the first conductor guide passage and the second conductor guide passage at the conductor clamping point is between 3° and 90° or between 3° and 80°.

9. The connecting terminal according to claim 1, wherein the first conductor guide passage terminates at a first conductor insertion opening of the housing, and the second conductor guide passage terminates at a second conductor insertion opening of the housing.

10. The connecting terminal according to claim 9, wherein the first and the second conductor insertion openings are arranged in a same housing wall of the housing or in different housing walls of the housing that are arranged at an angle to one another.

11. The connecting terminal according to claim 8, wherein a longitudinal axis of the first conductor guide passage runs obliquely with respect to a housing wall of the housing, at least in a region of a first conductor insertion opening of the housing, and/or a longitudinal axis of the second conductor guide passage runs obliquely with respect to the housing wall or a different housing wall of the housing, at least in a region of a second conductor insertion opening of the housing.

12. The connecting terminal according to claim 11, wherein the longitudinal axis of the first conductor guide passage is curved, at least in sections, and/or the longitudinal axis of the second conductor guide passage is curved, at least in sections.

13. The connecting terminal according to claim 1, wherein there is no bus bar in the connecting terminal.

14. The connecting terminal according to claim 1, wherein the the first and second conductor guide passages are configured so that the first and second electric conductors directly contact one another at the conductor clamping point.

15. The connecting terminal according to claim 1, wherein a first conductor stop to limit an insertion depth of the first electric conductor and/or a second conductor stop to limit an insertion depth of the second electric conductor are arranged in the housing.

16. The connecting terminal according to claim 9, wherein the first and second conductor insertion openings are arranged in a same housing wall of the housing, and wherein a longitudinal axis of the first conductor guide passage is curved, at least in sections, and a longitudinal axis of the second conductor guide passage is curved, at least in sections.

* * * * *